(12) United States Patent
Hunt (10) Patent No.: US 11,173,968 B2
(45) Date of Patent: Nov. 16, 2021

(54) MOTOR VEHICLE DOOR LATCH

(71) Applicant: Kiekert AG, Heiligenhaus (DE)

(72) Inventor: Robert J. Hunt, Davisburg, MI (US)

(73) Assignee: Kiekert AG, Heiligenhaus (DE)

( * ) Notice: Subject to any disclaimer, the term of this patent is extended or adjusted under 35 U.S.C. 154(b) by 681 days.

(21) Appl. No.: 15/982,143

(22) Filed: May 17, 2018

(65) Prior Publication Data
US 2019/0351952 A1 Nov. 21, 2019

(51) Int. Cl.
*B62D 33/037* (2006.01)
*E05B 81/14* (2014.01)
*E05B 83/18* (2014.01)
*B62D 33/027* (2006.01)
*E05B 81/90* (2014.01)
*E05C 9/04* (2006.01)
*E05B 81/16* (2014.01)

(52) U.S. Cl.
CPC ............ *B62D 33/037* (2013.01); *E05B 81/14* (2013.01); *E05B 83/18* (2013.01); *B62D 33/0273* (2013.01); *E05B 81/16* (2013.01); *E05B 81/90* (2013.01); *E05C 9/04* (2013.01)

(58) Field of Classification Search
CPC ......... Y10T 292/1047; Y10T 292/1082; Y10T 292/0945; Y10T 292/1021; Y10T 70/5889; Y10T 70/7062; Y10T 74/19684; E05B 81/06; E05B 81/16; E05B 81/14; E05B 85/02; E05B 77/34; E05B 77/36; E05B 81/28; E05B 81/08; E05B 83/12; E05B 83/18; E05B 81/90; Y10S 292/23; Y10S 292/43; Y10S 292/38; E05Y 2900/546; B62D 33/037; B62D 33/0273; E05C 9/04
See application file for complete search history.

(56) References Cited

U.S. PATENT DOCUMENTS

| | | | | |
|---|---|---|---|---|
| 3,454,299 A | * | 7/1969 | Hewitt | B62D 33/0273 296/50 |
| 3,593,816 A | * | 7/1971 | Kazaoka | E05B 77/48 180/281 |
| 5,295,720 A | * | 3/1994 | Budde | E05B 81/22 292/201 |
| 5,901,991 A | * | 5/1999 | Hugel | G07C 9/00182 292/201 |
| 5,924,324 A | * | 7/1999 | Kilker | F16H 19/08 15/250.3 |
| 6,676,190 B2 | * | 1/2004 | Daniels | E05F 15/619 296/106 |

(Continued)

FOREIGN PATENT DOCUMENTS

DE 101 00 008 A1 7/2002

*Primary Examiner* — Mark A Williams
(74) *Attorney, Agent, or Firm* — Renner, Otto, Boisselle & Sklar, LLP (57) ABSTRACT

The object of the present invention is a motor vehicle door latch, in particular a motor vehicle tailgate latch. In its basic construction, this comprises a plastic base plate (3) having a recess (13) and a drive unit (11, 12) arranged in the recess (13) Furthermore, a lever arrangement (4, 5, 6) acted on by the drive unit (11, 12) consisting of two or more levers (4, 5, 6) mounted on the base plate (3) is provided for. According to the invention, the levers (4, 5, 6) are detachably connected by means of a ratchet rotational connection (15, 16) and additionally axially secured by an individual attachment element (14).

20 Claims, 7 Drawing Sheets

(56) References Cited

U.S. PATENT DOCUMENTS

| | | | | |
|---|---|---|---|---|
| 6,824,177 B1 * | 11/2004 | Nass | ............... | E05B 81/16 |
| | | | | 292/201 |
| 8,245,549 B2 * | 8/2012 | Zagoroff | ............ | E05B 83/12 |
| | | | | 70/283 |
| 8,532,873 B1 * | 9/2013 | Bambenek | ......... | E05B 81/76 |
| | | | | 701/36 |
| 2007/0170341 A1 * | 7/2007 | Baumchen | ......... | B60N 2/20 |
| | | | | 248/503.1 |
| 2010/0050714 A1 * | 3/2010 | Zagoroff | ............ | E05B 85/18 |
| | | | | 70/256 |
| 2014/0136021 A1 * | 5/2014 | Bambenek | ......... | G07C 5/008 |
| | | | | 701/2 |

* cited by examiner

MOTOR VEHICLE DOOR LATCH

The invention relates to a motor vehicle door latch, in particular to a motor vehicle tailgate latch, comprising a plastic base plate with a recess, a drive unit arranged in the recess and a lever arrangement acted on by the drive unit consisting of two or more levers mounted on the base plate.

A motor vehicle door latch of such a construction is described in DE 101 00 008 A1. This document describes a so-called electrical latch, i.e. a latch that is equipped with a drive unit for opening of the latch, typically by lifting a pawl out of its engagement with a catch, both being components of the locking mechanism of the latch, with the aid of the drive unit. The compact construction attained for such an electric lock and the few components necessary predestine such motor vehicle door latches inter alia as flap latches and, in particular, tailgate latches.

Such tailgate latches are often used for 'pick-ups', i.e. motor vehicles with an open loading area. The latch relevant in this context is, for example, arranged centrally on a tailgate and works via connected rods or cable pulls on latching elements arranged respectively laterally on a wall of the loading flap or also the tailgate, as described for example in U.S. 2010/0050714 A1. Such flap latches or tailgate latches need to provide the states "unbolted", "bolted" and "opening". These states can, for example, be attained remotely controlled with the aid of the drive unit and consequently in an electromotorized manner. Furthermore, manual execution of these functional positions is often required. For this purpose, a bolting element which can be operated manually or in a motorized manner is regularly provided.

For this purpose, the central base plate is provided, to which an external door handle is generally connected in order to lift the latch elements and to be able to open the motor vehicle door latch overall. In fact, the "bolted" function corresponds to the stated external door handle being redundant in relation to the lever arrangement or during a deflection of the external door handle in this functional position by means of the lever arrangement, for example, a rod or Bowden cable is unable to act on the lateral latching elements. On the contrary, the "unbolted" functional position corresponds to the Bowden cables or rods being able to work on the lateral latch elements by means of the stated external door handle. Consequently, in that case by acting on the external door handle the latch elements are opened and consequently the flap is also pivoted out.

The state of the art has fundamentally proven itself. However, work usually takes place here with massive levers in the lever arrangement and also a correspondingly massive base plate supporting the levers. This not only leads to a protruding construction, but also to an increased weight of such a motor vehicle door latch. The invention intends to provide an overall remedy here.

The invention is based on the technical problem of further developing a motor vehicle door latch in such a way that the construction is simplified and of light weight. Furthermore, this hereby aims to facilitate installation overall.

In order to solve this technical problem, in a class-specific motor vehicle door latch the invention proposes that the at least two levers of the lever arrangement are detachably connected by means of a ratchet rotational connection and are additionally axially secured by an individual attachment element.

Both levers of the lever arrangement are consequently coupled by means of a ratchet rotational connection according to the invention. Such a ratchet rotational connection allows pivoting movements of the levers up to a certain point. Furthermore, the ratchet rotational connection ensures that both levers are connected in a swiveling manner without an additional storage bolt anchored in the base plate needing to be provided for, for example, which is. Instead, on the one hand the two levers are supply connected by the ratchet rotational connection and, on the other hand, secured axially by the individual attachment element. Furthermore, the ratchet rotational connection, including the axial securing by the individual attachment element, ensures that the lever arrangement is thus pivotably accommodated on the base plate. i.e. the ratchet rotational connection simultaneously replaces a bearing bolt.

The individual attachment element is advantageously a screw. However, in general, other individual attachment elements can also be used. The term "individual attachment element" expresses for all of these embodiments that only a single attachment element ensures the axial securing of both levers of the lever arrangement pivotably accommodated. The configuration is usually such that the individual attachment element in question simultaneously defines a rotational axis of the lever arrangement.

Generally, both levers of the lever arrangement are coupled with interposition of an actuating element. The actuator element itself can be acted on by means of a triggering lever of the lever arrangement with the aid of the drive unit. In principle, manual impingement of the actuator element is also conceivable by means of a connected actuating lever or also a bolting element for manual activation. In addition to the triggering lever, the lever arrangement generally has an operating lever.

The drive unit is typically connected to the triggering lever. Furthermore, the drive unit is usually a linear actuating unit. The actuating element possesses at least a stop for the rotational towing of the previously stated operating lever as a further component of the lever arrangement in addition to the triggering lever. The triggering lever is usually pretensioned in respect of the actuating element with the aid of a spring in the "unbolting" direction.

Furthermore, the lever arrangement overall is pre-tensioned in the "unbolting" direction with the aid of a return spring. The lever arrangement can overall be made of plastic, so that an especially cost-effective production and a lightweight construction are achieved. This is because the crucial structural elements of the motor vehicle door latch according to the invention, in particular the base plate and the lever arrangement, are made of plastic. The latch elements, in contrast, typically arranged on lateral walls in the region of the tailgate and interacting with the motor vehicle door latch, are massive steel components.

As a result, a motor vehicle door latch is provided that have advantageously low weight. It is especially envisioned to use the motor vehicle door latch as a motor vehicle tailgate latch. The tailgate usually has a centrally arranged base plate and an external door handle mounted on the base plate, with the help of which the relevant motor vehicle door latch can be opened. For this purpose, the motor vehicle door latch or the lever arrangement must initially be transferred into the "unbolted" position. In this functional position, the latch elements provided for on both sides of the tailgate can be lifted from their corresponding engagement with a locking bolt respectively provided for on the pertaining lateral wall. This all succeeds taking into account an especially compact construction and with a reduced weight compared to the state of the art. Simultaneously, two motor vehicle door latches overall are hereby executed which jointly bolt and unbolt a tailgate. The bolting and unbolting can be performed both manual and mechanical, as known in principle.

The triggering lever can, in a further refinement of the invention, have a key cylinder window. A key cylinder window is to be understood to mean an opening in the triggering lever that is provided to interface with a manual key cylinder, facilitating manual bolting/unbolting. With the provision of a key cylinder window, the motor vehicle door latch can be both manually and electrical locked and unlocked. This is attained without the need to provide a further additional lever having a window to interface with a key cylinder lever.

The invention is explained in further detail hereafter on the basis of drawings describing two exemplary embodiments. The following are shown.

Figure 1:
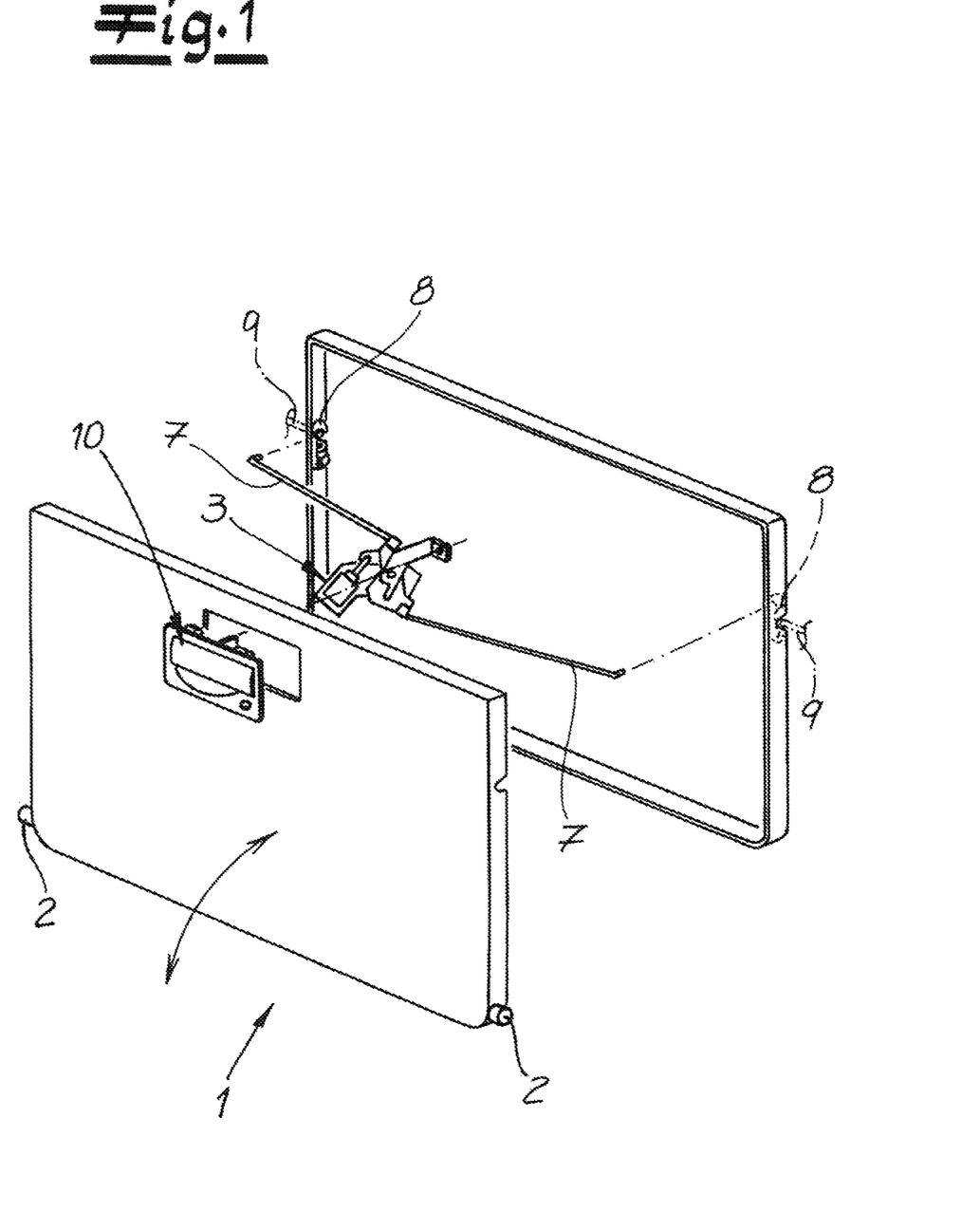
FIG. 1 an overview of a tailgate together with the motor vehicle door latch according to the invention, FIG. 2 an overview of the motor vehicle door latch according to the invention in the "unbolted" position, FIG. 3 the motor vehicle door latch according to FIG. 2 in an exploded view, FIG. 4A-4C different functional positions of the motor vehicle door latch, namely "unbolted" in FIG. 4A, "opened" in FIG. 4B and finally "bolted" in FIG. 4C and FIG. 5 a further modified embodiment.

In FIG. 1, a tailgate 1 pivotably connected by means of lower bearing pins 2 on both sides to an open loading area of a so-called "pick-up", i.e. a motor vehicle with an open loading area, is shown. The tailgate 1 is equipped with a motor vehicle door latch which, in the present case, is a tailgate latch. The motor vehicle door latch has a plastic base plate 3. Furthermore, the motor vehicle door latch comprises a lever arrangement 4, 5, 6.

Connecting rods, Bowden cables or general connectors 7 which are connected on both sides of the base plate 3 to the lever arrangement 4, 5, 6 are connected to the further basic construction. A latch element 8 is provided for on the free end of the respective connector 7 which is respectively connected pivotably to the tailgate 1 on the edge. The latch element 8 on both edges of the tailgate 1 respectively interacts with bolts or locking bolts 9 which are arranged opposite one another on the lateral walls respectively bordering the loading area in the region of the tailgate 1.

An external door handle 10 and a drive unit 11, 12 are also part of the fundamental construction of the motor vehicle door latch. The drive unit 11, 12 or its drive motor or electromotor 11 are arranged in a recess 13 of the base plate 3 made of plastic as apparent in particular in the exploded view according to FIG. 3. Both motor vehicle door latches illustrated in principle in FIG. 1 can be bolted and unbolted jointly both with aid of the external door handle 10 and also with recourse to the drive unit 11, 12 as explained in detail hereafter.

Figure 2:
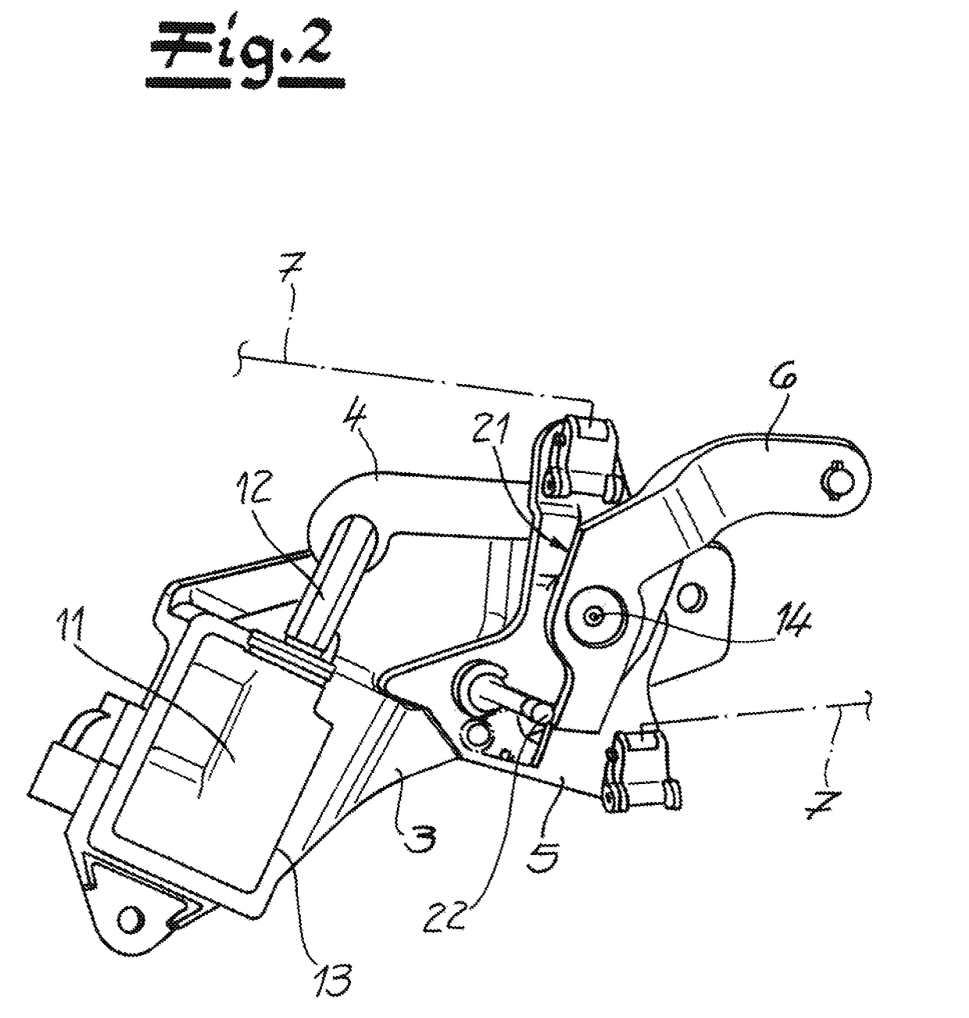
Figure 4A:
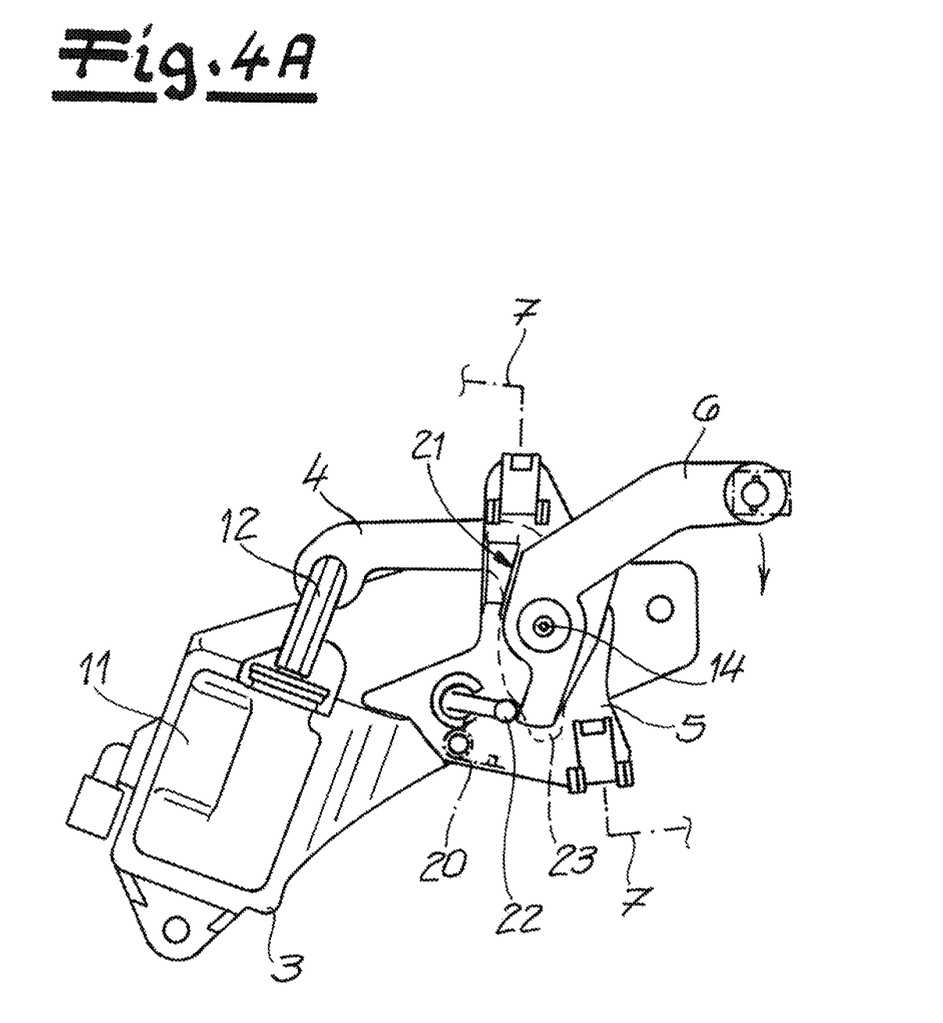
Figure 4B:
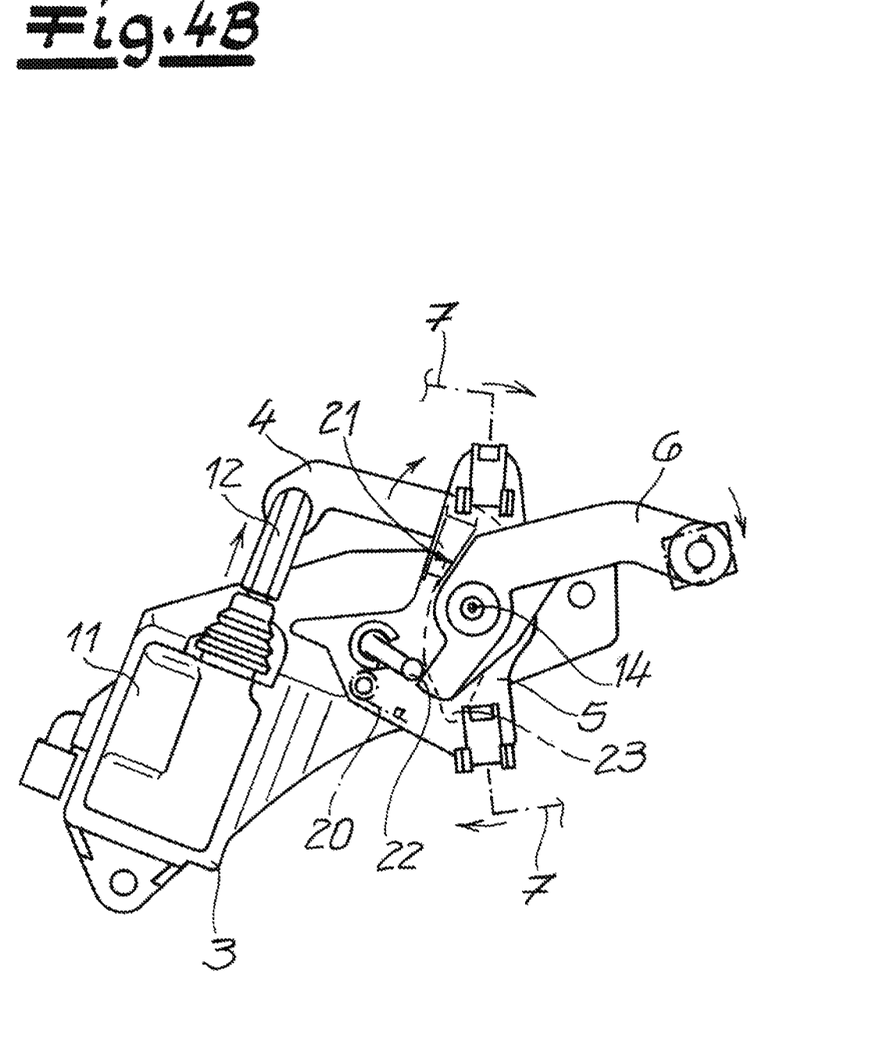

If the motor vehicle door latch is in the "unbolted" functional position, as illustrated in FIGS. 2 and 4A, the lever arrangement 4, 5, 6 can be acted on with the aid of the external door handle 10, in such a way that by means of the connectors 7, respectively connected on both sides on the lever arrangement 4, 5, 6, the corresponding latch elements 8 can be lifted from their engagement with the pertaining locking bolt 9. Alternatively to such a manual opening process with the aid of the door handle 10, it is also conceivable according to the illustration in FIG. 4B that the latch elements 8 and consequently the motor vehicle door latch overall are opened by means of an electromotor with the aid of the drive unit 11, 12.

Figure 4C:
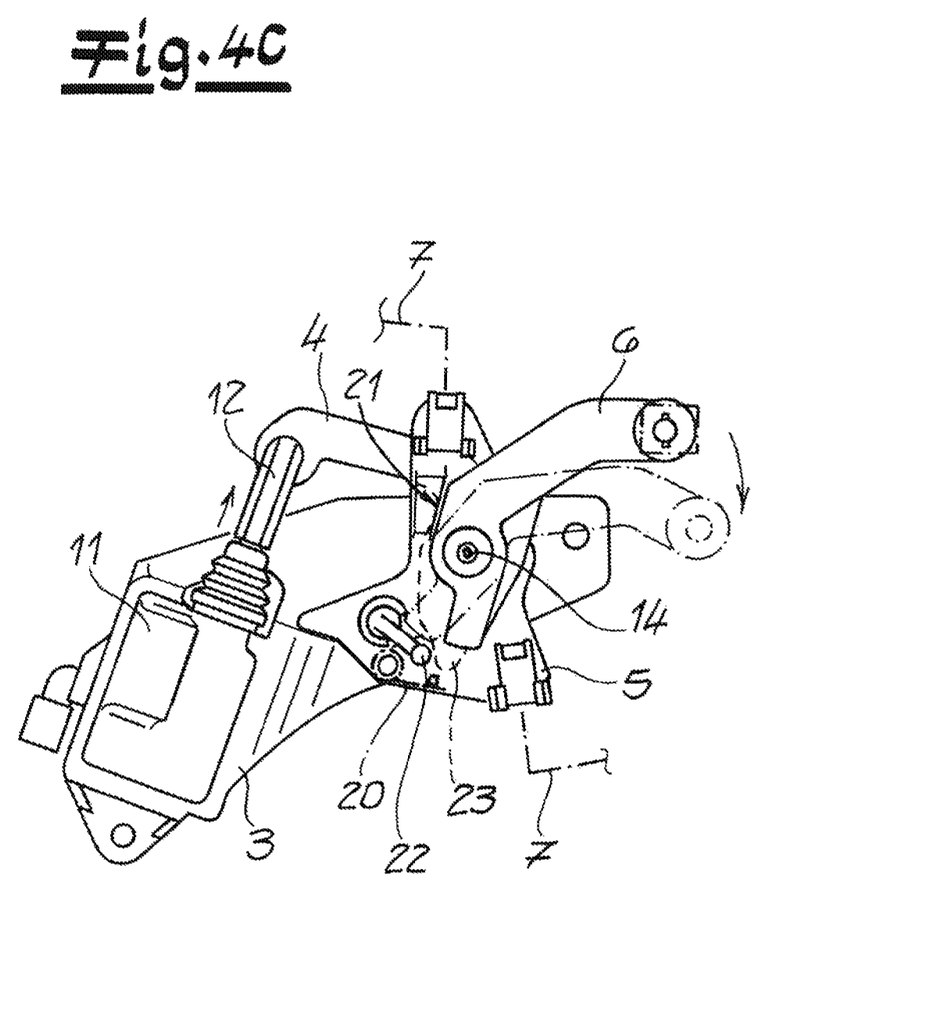

As a consequence hereof, the relevant latch element 8 is freed from the relevant locking bolt 9 in both cases and the tailgate 1 can be opened. If the motor vehicle door latch is, in contrast, in the "bolted" functional position as shown in FIG. 4C, relevant acting on the external door handle 10 is thus redundant in relation to the relevant connecting means 7 and the pertaining latching elements 8 are not lifted from their engagement with the corresponding locking bolts 9. FIG. 4C depicts this by an action of the external door handle 10 being depicted which remain ineffective overall. In this "bolted" position according to FIG. 4C, the drive unit 11, 12 is furthermore extended and can consequently not ensure opening of the latch elements 8. The tailgate 1 remains closed.

Figure 3:
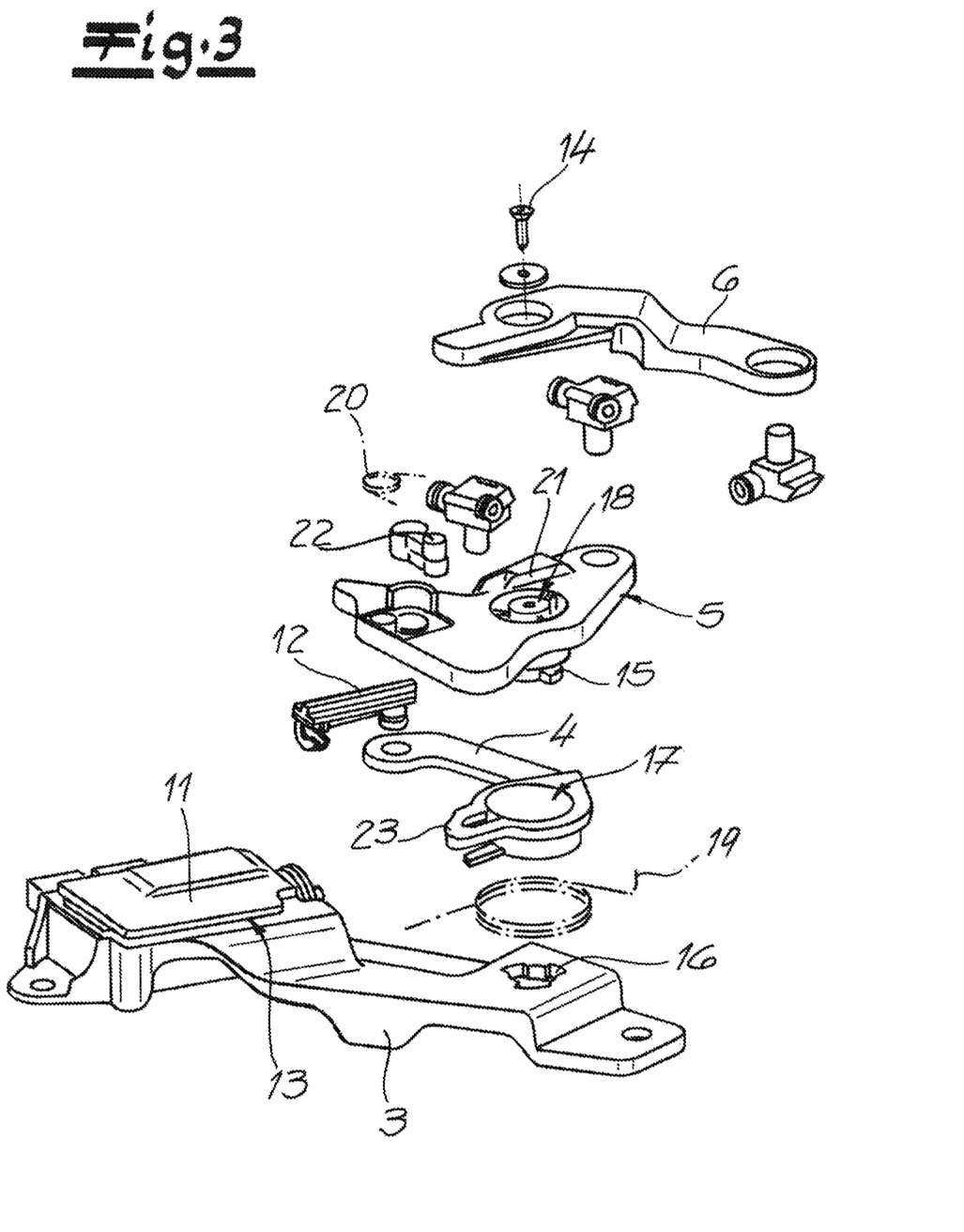

The lever arrangement 4, 5, 6 according to the invention comprises two or more levers mounted on the base plate 3, as a comparison between FIGS. 2 and 3 makes directly clear. In fact, a triggering lever 4 on which the connecting unit 11, 12, is connected is initially executed here. The electromotive drive or electromotor 11 is configured as a linear drive overall and consequently the drive unit 11, 12 is formed as a linear actuator unit 11, 12 overall. Linear actuator movements of the electromotor 11 are transmitted via a thrust lever 12 to the connected triggering lever 4. To this end, the thrust lever 12 is suspended in the triggering lever 4 with one end and connected via a plug connection on the other end with a pinion pin of the drive motor 11.

In addition to the triggering lever 4 the lever arrangement 4, 5, 6 also has an operating lever 6 as a crucial element. The operating lever 6 is directly or indirectly coupled with the external door handle 10 as directly made apparent by a comparison of FIGS. 1 to 4. An actuator element 5 is also provided for.

Both levers 4, 6, i.e. the triggering lever 4 and the operating lever 6 are connected with interposition of the actuating element 5. The connection of the levers 4, 5, 6 overall is such that these are detachably connected by means of a ratchet rotational connection 15, 16 as can be found according to the exploded view in FIG. 3. The ratchet rotational connection 15, 16 also ensures pivotable mounting of the lever arrangement 4, 5, 6 on the base plate 3. An individual attachment element 14 also ensures axial securing of the levers 4, 5, 6 which in the exemplary embodiment involves not restrictively an attachment screw 14. The affixing screw 14 or the individual attachment element 14 only ensures the axial securing of the ratchet rotational connection 15, 16 between the individual levers 4, 5, 6 of the lever arrangement 4, 5, 6. The individual attachment element 14 also simultaneously defines a rotational axis of the lever arrangement 4, 5, 6.

As can be seen in the exploded view of FIG. 3, the actuating element 5 is equipped with a bayonet pin 15 engaging into a bayonet recess 16 in the base plate 3. The bayonet pin 15 penetrates an opening 17 in the triggering lever 4 in this process. In this way the ratchet rotational connection 15, 16 of the levers 4, 5, 6 is provided. The operating lever 6 is now pivotably connected via the individual attachment element 14 to the bayonet pin 15 and consequently to the actuator element 5. To this end, the individual attachment element 14 engages axially into a socket 18 on the head side of the bayonet pin 15 on the actuating element 5.

A return spring 19, which surrounds the opening 17 in the triggering lever 4 is significant and overall ensures that the lever arrangement 4, 5, 6 is pre-tensioned overall in the "unbolting" direction. This means that the return spring 19 ensures action on the lever arrangement 4, 5, 6 starting from the "bolted" position according to the illustration in FIG. 4C to the extent that the lever arrangement 4, 5, 6 in the exemplary embodiment in the anti-clockwise direction is acted on in relation to the rotational axis defined by the individual attachment element 14. i.e. the return spring 19 ensures that the lever arrangement 4, 5, 6 in an anti-clockwise direction is acted on around the individual attachment element 14 in the direction of the "unbolted" position according to FIG. 4A.

In the exploded view according to FIG. 3, a further spring 20 pre-tensioning the triggering lever 4 in respect of the actuating element 5 is visible, namely also in the "unbolting" direction, i.e. the spring 20 ensures that the triggering lever 4 is pre-tensioned in an anti-clockwise direction in respect of the actuating element 5.

The actuating element 5 possesses a stop 21 for the rotational slaving of the operating lever 6 of the operating lever arrangement 4, 5, 6. By means of this stop 21 in conjunction with a counterstop 22, also on the actuating element 5, the operating lever 6 can be acted on in the "unbolted" position according to FIG. 4A or during "opening" in the illustration according to FIG. 4B with the aid of the external door handle 10, so that the actuating element 5 is pivoted around the common rotational axis defined by the individual attachment element 14. As a consequence hereof, the accordingly pivoted actuating element 5 ensures that the connectors 7 are acted on in order to remove the relevant latch elements 8 from the corresponding locking bolts 9 so that the tailgate 1 can subsequently be opened overall.

The lever arrangement 4, 5, 6 is also made of plastic like the base plate 3 in the exemplary embodiment. The individual levers 4, 5, 6 of the lever arrangement 4, 5, 6 may respectively involve plastic levers. The base plate 3 constitutes an injection-molded plastic component. Thus, the tailgate latch according to the invention can be manufactured simply, cost-effectively and with a light weight. Furthermore, the ratchet rotational connection in the form of the bayonet pin 15 engaging into the bayonet recess 16 in conjunction with the axial securing by means of the individual attachment element 14 ensures that expensive mountings can be dispensed with and installation is simple and intuitive.

In FIG. 4A, the functional state "unbolted" is shown. Starting from this functional state, by acting on the external door handle 10 the operating lever 6 can be manually pivoted in a clockwise direction in relation to the rotational axis defined by the individual attachment element 14. In this process, the combinational effect of the stop 21 in conjunction with the counterstop 22 ensures that the operating lever 6 slaves the actuating element 5. Thus, the respective connectors 7 and consequently the corresponding latch elements 8 are being acted on as described and the tailgate 1 can be opened overall. As soon as the action on the external door handle 10 is dispensed with, the operating lever 6 returns to its "unbolted" starting position according to FIG. 4A.

In addition to such a manual opening process of the latching elements 8, it is also possible to proceed with the opening process by remote control with the aid of the drive unit 11, 12. This can be recognized in the transition from FIG. 4A to FIG. 4B. The drive unit 11, 12 with the thrust lever 12 in this case in fact ensures that the triggering lever 4 is pivoted around the axis defined by the individual attachment element 14 in a clockwise direction. Hereby, the triggering lever 4 slaves the actuating element 5 by means of a boom 23 that interacts with the counterstop 22 on the actuating element 5. The boom 23 is shown in the exploded view of FIG. 3. As a consequence hereof, the actuating element 5 is slaved from the functional illustration according to FIG. 4A to the position according to FIG. 4B and acts correspondingly on the connectors 7, since the operating lever 6 lies adjacent to both stops 21, 22 or both on the stop 21 and also the counterstop 22. In this way, the latch elements 8 are opened.

If the transition from FIG. 4A "unbolted" into the position according to FIG. 4C "bolted" is viewed, then starting from FIG. 4A, initially the drive unit 11, 12 is extended. In this process, the triggering lever 4 is pivoted. The boom 23 on the triggering lever 4 acts on the counterstop 22 of the actuating element 5 and retains it in a lowered position. The actuator element 5 thus remains at rest overall. Now the "bolted" state according to FIG. 4C is attained. In this "bolted" state, any action on the external door handle 10 of the operating lever 6 is redundant because the operating lever 6 pivots freely with respect to the actuating element 5 as the operating lever 6 can no longer interact with the counterstop 22 on the actuating element 5. Therefore, the latch elements 8 also remain unaffected. The motor vehicle door latch retains its "closed" position.

Figure 5:
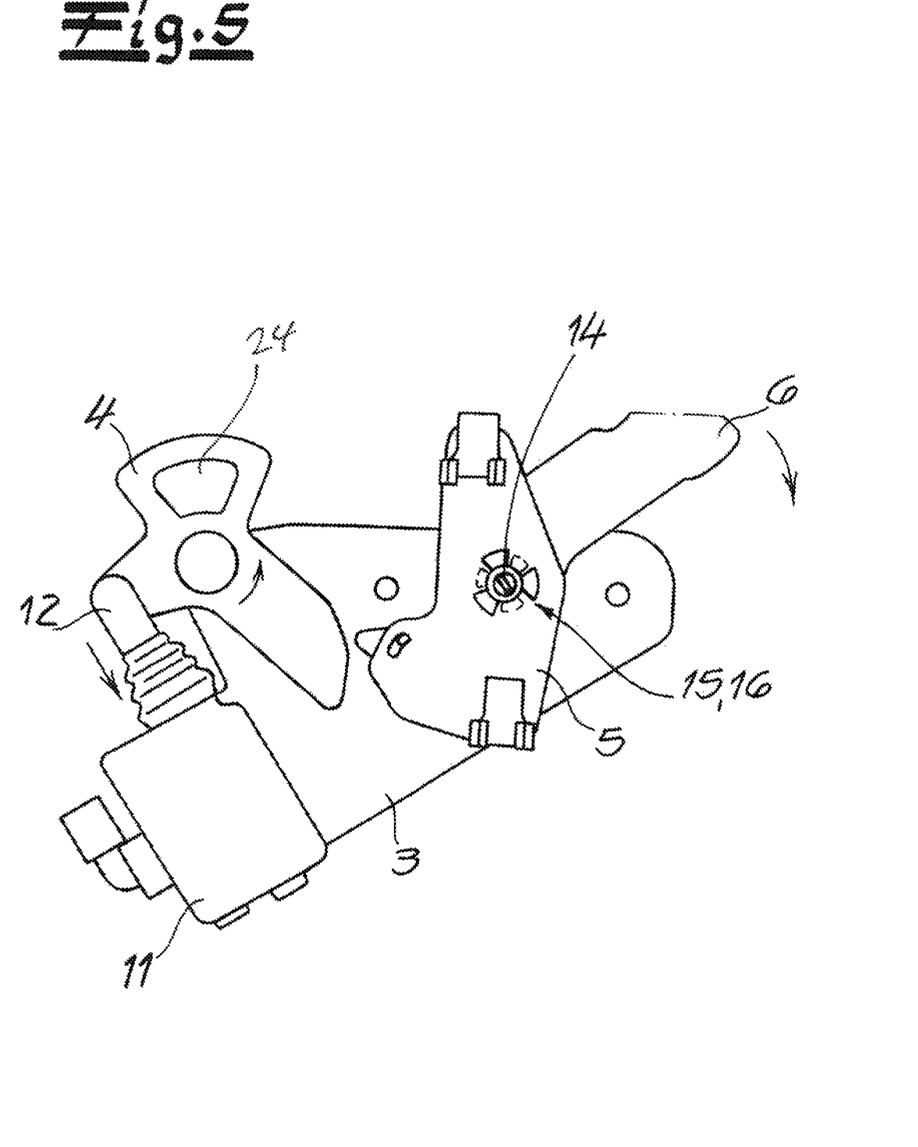

In FIG. 5, a slightly modified variant compared to the previously described exemplary embodiment according to FIGS. 2, 3 and 4A to 4C is shown. A drive unit 11, 12 working on a lever arrangement 4, 5, 6 is again present. As illustrated in FIG. 5, action of the drive unit 11, 12 in the arrow direction illustrated in FIG. 5 leads to the triggering lever 4 being pivoted around its mounting in respect of the base plate 3 in the anti-clockwise direction illustrated in FIG. 5. The triggering lever 4 thus lies with a pin on the actuator element 5 and ensures that the operating lever 6 is pivoted in the clockwise direction in this process, as also illustrated in FIG. 5. Thus, the motor vehicle door latch assumes a "bolted" position according to the illustration shown in FIG. 4C.

As previously explained, the actuator element 5 and the operating lever 6 are presently coupled by means of the ratchet rotational connection 15, 16 forming a bayonet coupling with the bayonet pin 15 and the bayonet recess 16. The triggering lever 4 is retained by detents comprised on the molded in pivot on base plate 3. Thus, the assembly can further be reduced by eliminating the need for a dedicated individual attachment element.

The triggering lever 4 has a key cylinder window 24 provided to interface with a manual key cylinder, facilitating manual bolting/unbolting of the motor vehicle door latch. With the key cylinder window 24, the triggering lever 4 provides a manual unlocking feature, especially for an emergency opening. By introducing a key cylinder through an opening into the key cylinder window 24 and rotating the triggering lever 4 with the inserted key cylinder from a center position in clockwise direction, the motor vehicle door latch can be unbolted. By turning the triggering lever 4 with the inserted key cylinder in anti-clockwise direction, starting from the center position, the motor vehicle door latch can be bolted. The key cylinder can only be inserted or retrieved with the triggering lever 4 in the center position. The triggering lever 4 with the key cylinder window 24 provides both an electrical and a manual bolting/unbolting function.

The invention claimed is:

1. A motor vehicle door latch including at least one latch element, the at least one latch element configured for interaction with a respective locking bolt in a closed configuration of the at least one latch element for securing the motor vehicle door latch, and the at least one latch element configured to disengage from the respective locking bolt in an open configuration of the at least one latch element for releasing the motor vehicle door latch, the motor vehicle door latch comprising:

a plastic base plate having a recess, a drive unit arranged in the recess, and a lever arrangement that is connected to the at least one latch element and the lever arrangement acted on by the drive unit for opening the at least one latch element, wherein the lever arrangement includes two or more levers mounted on the base plate along a common rotational axis, wherein the lever arrangement includes an actuating element connecting the two or more levers, the actuating element being connected to the at least one latch element, the actuating element being activated by the drive unit and/or manually to open the at least one latch element, and wherein the two or more levers are detachably connected to each other by a ratchet rotational connection configured to enable independent swiveling movement of the two or more levers relative to the base plate, the two or more levers also being axially secured along the common rotational axis by an individual attachment element that extends along the common rotational axis.

2. The motor vehicle door latch of claim 1, wherein the individual attachment element is configured to secure the ratchet rotational connection along the common rotational axis between the two or more levers.

3. The motor vehicle door latch of claim 1, wherein the actuating element is acted on by the drive unit by a triggering lever of the lever arrangement.

4. The motor vehicle door latch of claim 3, wherein the drive unit is connected to the triggering lever.

5. The motor vehicle door latch of claim 1, wherein the drive unit is formed as a linear actuating unit.

6. The motor vehicle door latch of claim 1, wherein the actuating element has at least one stop for rotational slaving of an operating lever of the lever arrangement.

7. The motor vehicle door latch of claim 3, wherein the triggering lever is pre-tensioned relative to the actuating element in an unbolting direction with a spring.

8. The motor vehicle door latch of claim 1, wherein the lever arrangement is pre-tensioned in an unbolting direction with a return spring.

9. The motor vehicle door latch of claim 1, wherein the lever arrangement is made of plastic.

10. The motor vehicle door latch of claim 1, wherein the individual attachment element is an affixing screw.

11. The motor vehicle door latch of claim 1, wherein the ratchet rotational connection includes a bayonet recess formed in the base plate and a corresponding bayonet pin formed on one of the two or more levers.

12. The motor vehicle door latch of claim 11, wherein the bayonet recess and the corresponding bayonet pin share the common rotational axis.

13. The motor vehicle door latch of claim 1, wherein the two or more levers includes a triggering lever having an opening arranged along the common rotational axis, an actuator element having a pin that protrudes from the actuator element and extends through the opening along the common rotational axis, and an operating lever.

14. The motor vehicle door latch according to claim 13, wherein all of the two or more levers are arranged along the common rotational axis.

15. The motor vehicle door latch according to claim 13, wherein the actuating element is axially interposed between the triggering lever and the operating lever along the common rotational axis.

16. The motor vehicle door latch according to claim 13, wherein the triggering lever is connected to the drive unit.

17. The motor vehicle door latch according to claim 13, wherein the triggering lever defines a key cylinder window.

18. A motor vehicle door latch including at least one latch element, the at least one latch element configured for interaction with a respective locking bolt in a closed configuration of the at least one latch element for securing the motor vehicle door latch, and the at least one latch element configured to disengage from the respective locking bolt in an open configuration of the at least one latch element for releasing the motor vehicle door latch, the motor vehicle door latch comprising:

a plastic base plate having a recess, a drive unit arranged in the recess, and a lever arrangement that is connected to the at least one latch element and the lever arrangement acted on by the drive unit for opening the at least one latch element, wherein the lever arrangement includes two or more levers mounted on the base plate along a common rotational axis, wherein the two or more levers includes a triggering lever connected to the drive unit, the triggering lever having an opening arranged along the common rotational axis, an actuator element having a pin that protrudes from the actuator element and extends through the opening along the common rotational axis, and the two or more levers includes an operating lever configured for attachment to a handle, and wherein the two or more levers are detachably connected to each other by a ratchet rotational connection configured to enable independent swiveling movement of the two or more levers relative to the base plate, the two or more levers also being axially secured along the common rotational axis by an individual attachment element that extends along the common rotational axis.

19. The motor vehicle door latch according to claim 18, wherein the triggering lever is connected to the drive unit.

20. The motor vehicle door latch according to claim 18, wherein the triggering lever defines a key cylinder window.

* * * * *